United States Patent [19]

von Winckelmann

[11] Patent Number: 4,785,899

[45] Date of Patent: Nov. 22, 1988

[54] VEHICLE WITH SPHERICAL-SHAPED WHEELS FOR STEERING AND SPEED CONTROL PURPOSES

[76] Inventor: Emil H. von Winckelmann, 3108 Blossom La., Redondo Beach, Calif. 90278

[21] Appl. No.: 45,393

[22] Filed: May 4, 1987

[51] Int. Cl.$^4$ ............................................. B62D 57/00
[52] U.S. Cl. ...................................... 180/7.1; 180/252
[58] Field of Search ............... 180/140, 252, 7.1, 6.5; 280/5.28

[56] References Cited

U.S. PATENT DOCUMENTS 3,001,601  9/1961  Aghnides ..................... 180/7.1 X
3,212,594  10/1965  Scott .............................. 180/7.1
4,353,428  10/1982  Kovar et al. ..................... 180/7.1
4,519,466  5/1985  Shiraishi ..................... 180/252 X

FOREIGN PATENT DOCUMENTS 2172558  9/1986  United Kingdom ............... 180/140

Primary Examiner—John J. Love
Assistant Examiner—Mitchell J. Hill
Attorney, Agent, or Firm—Keith D. Beecher

[57] ABSTRACT

A vehicle having spherical-shaped wheels and which may be steered, and whose speed may be controlled, by varying the inclinations of the wheels about respective horizontal axes parallel to the longitudinal axis of the vehicle.

2 Claims, 4 Drawing Sheets

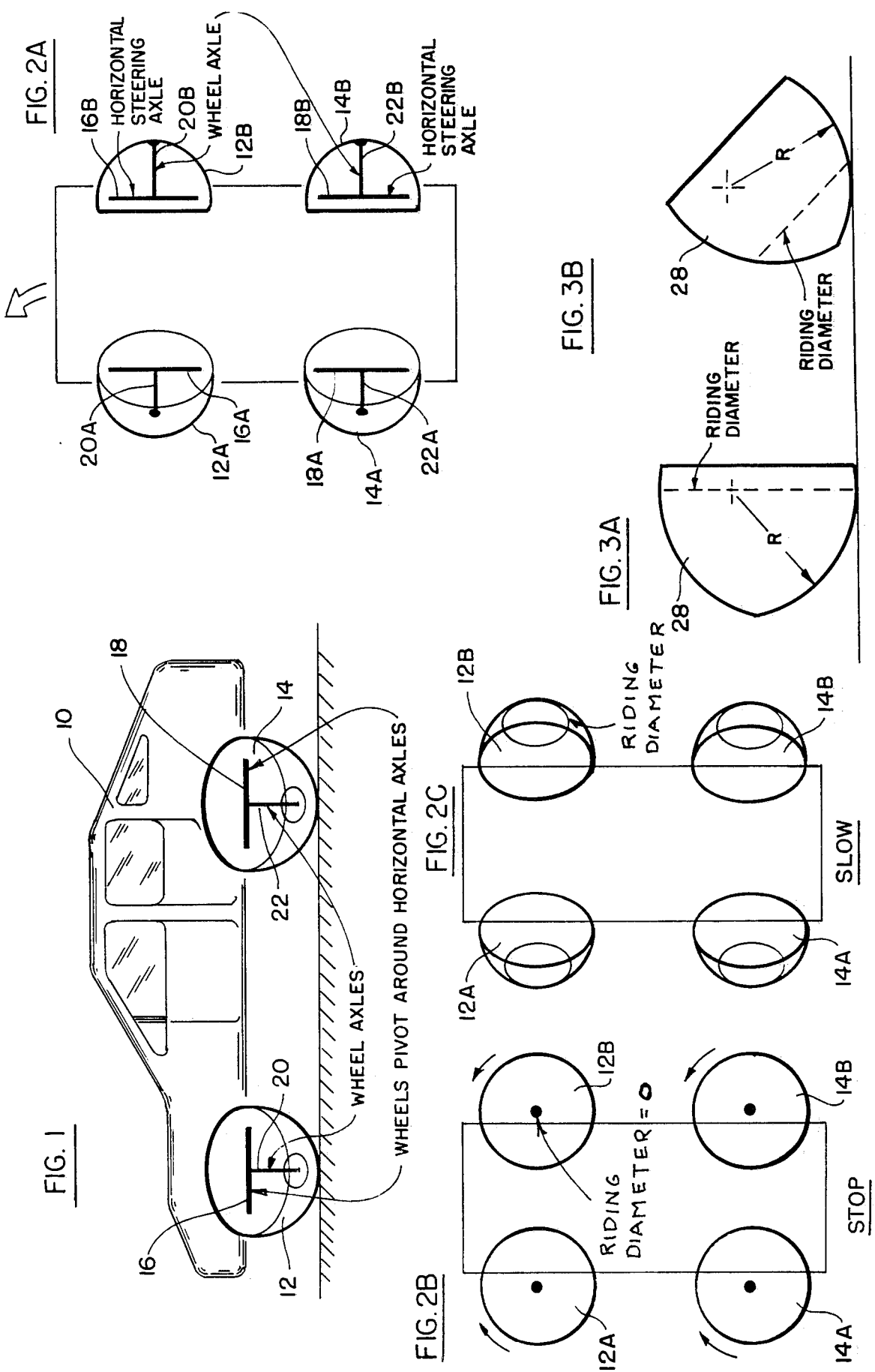

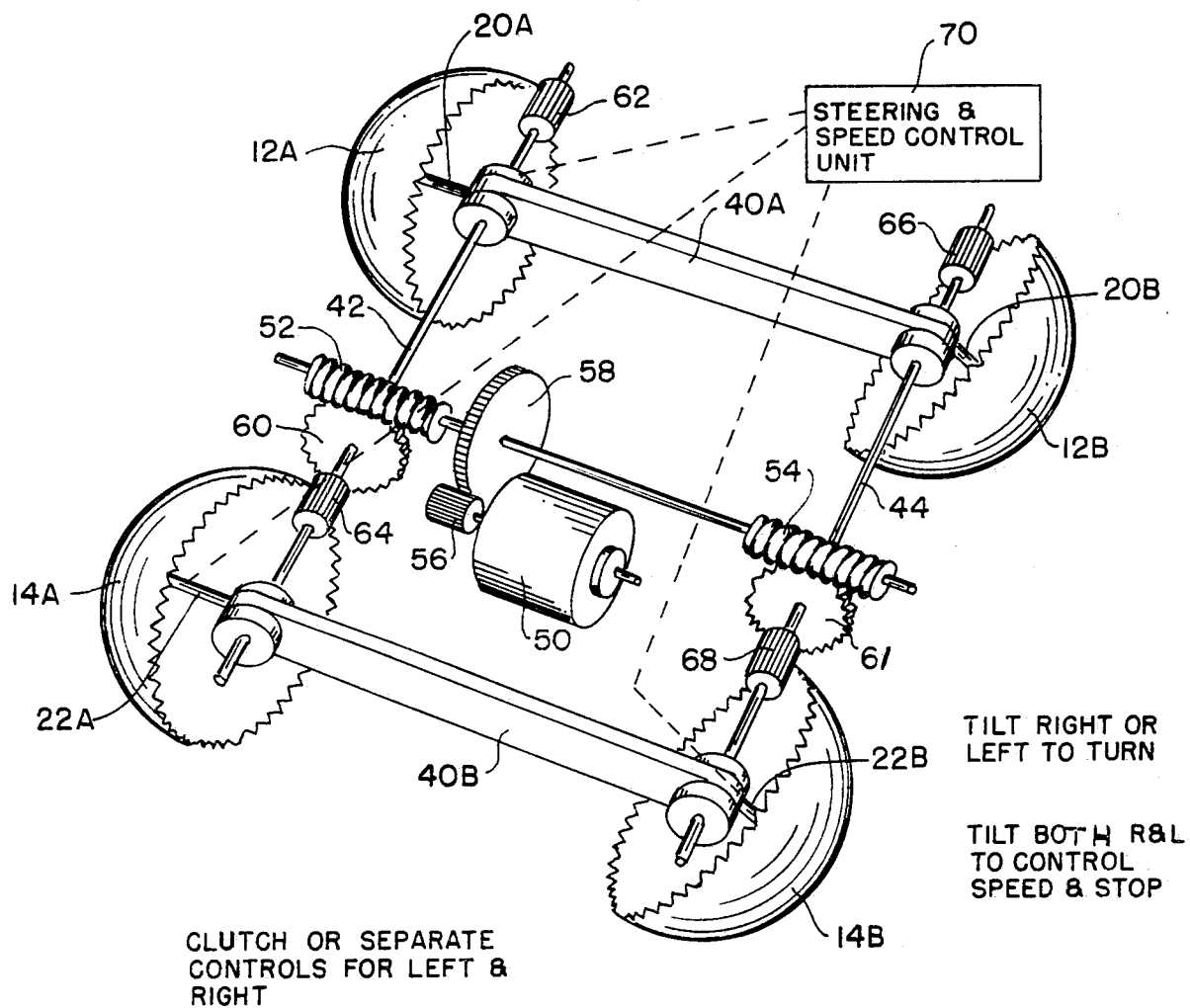

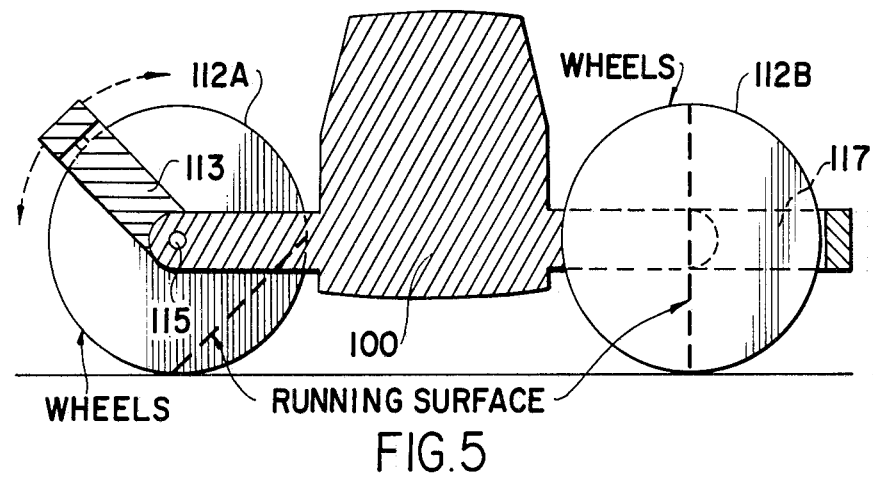
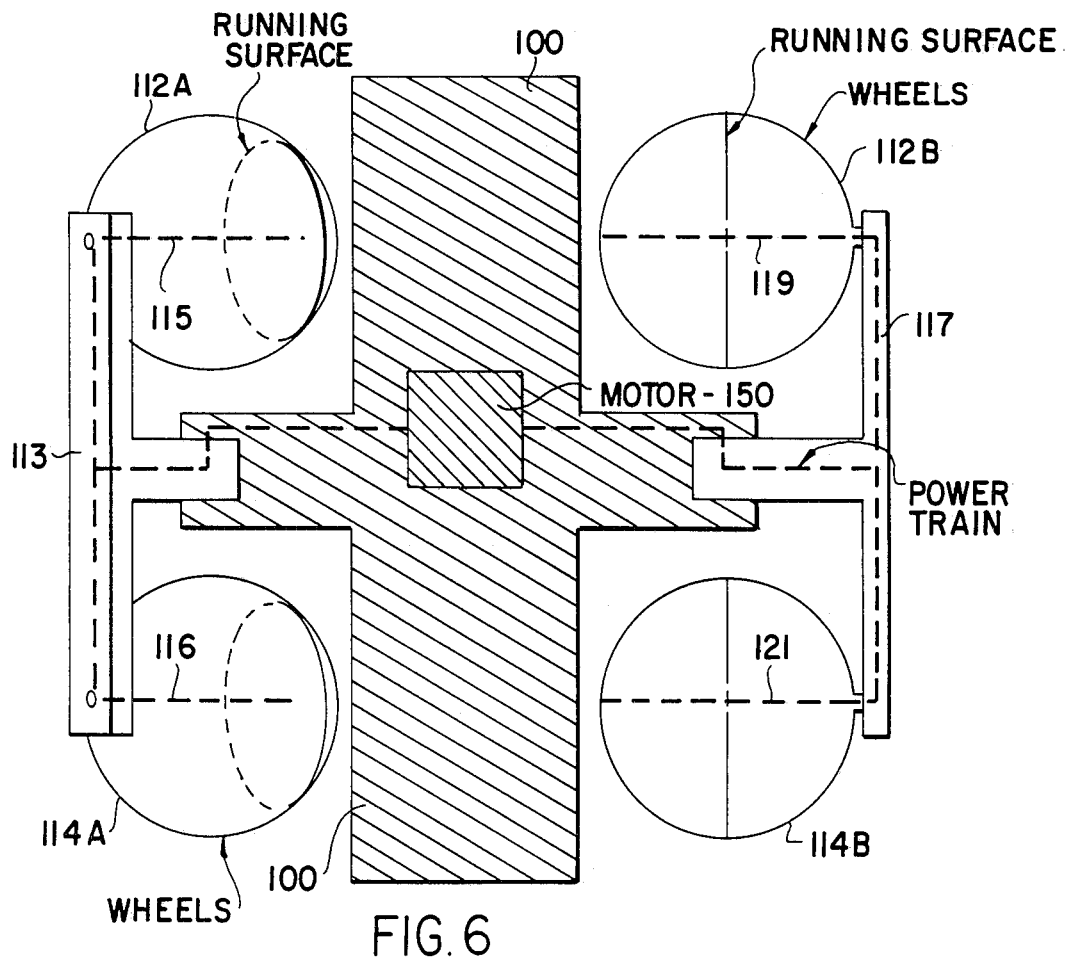

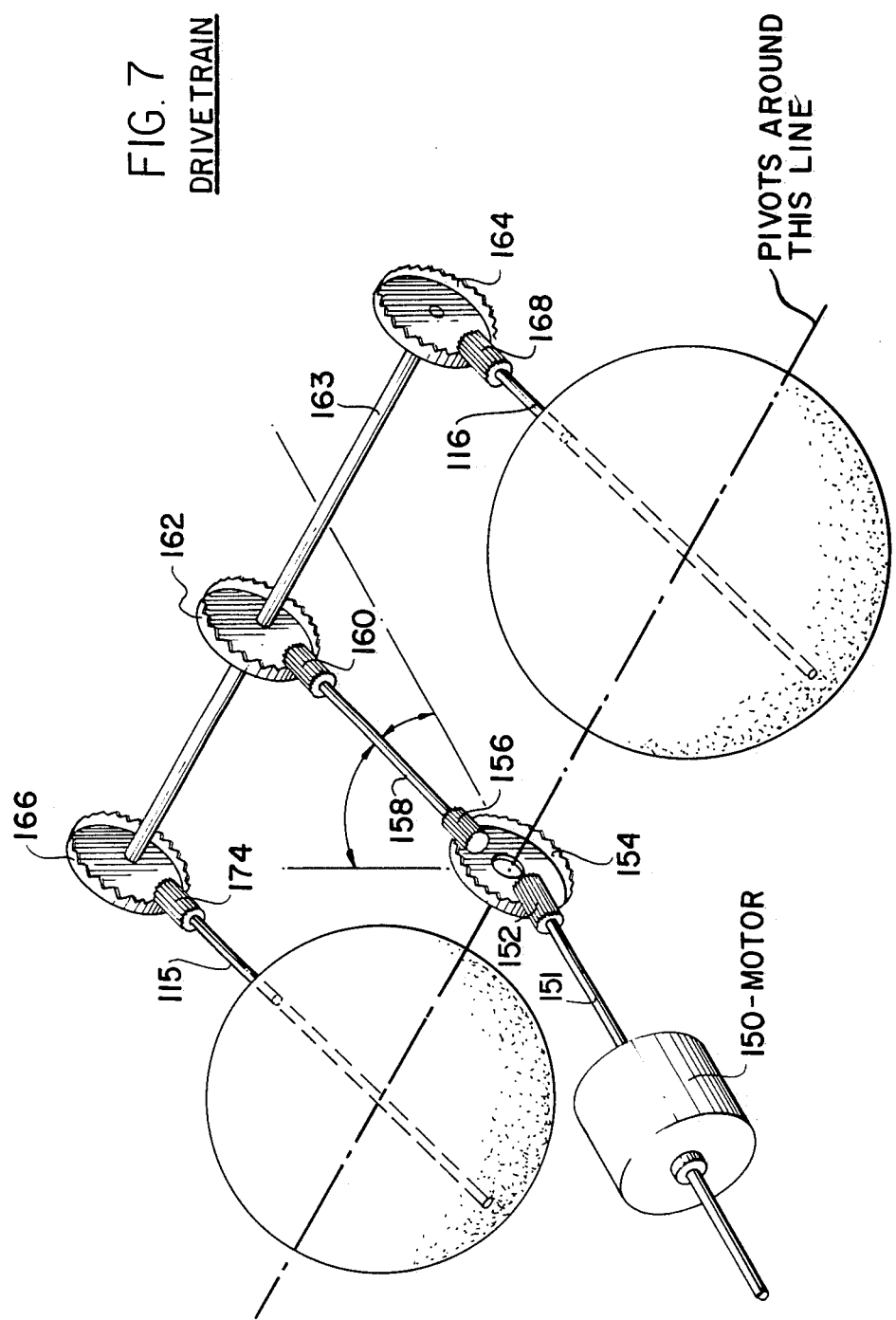

ered on the page.

VEHICLE WITH SPHERICAL-SHAPED WHEELS FOR STEERING AND SPEED CONTROL PURPOSES

BACKGROUND OF THE INVENTION

An important objective of the present invention is to provide a simplified construction for a vehicle in which steering and speed control functions may be carried out in a simple and expeditious manner.

A feature of the vehicle of the invention is that it is provided with spherical-shaped wheels which may be driven by a constant speed motor. The vehicle may be steered, speeded up, slowed down and stopped, without change of motor speed, by the simple expedient of turning the wheels about respective horizontal axes extending parallel to the longitudinal axis of the vehicle.

BRIEF DESCRIPTION OF THE DRAWINGS

FIG. 1 is a schematic representation of a vehicle which, in accordance with the present invention, is equipped with hemispherical wheels which are intended to come within the definition "spherical configuration" as used in the present specification and claims, and which are capable of being turned about respective horizontal axles extending parallel to the longitudinal axis of the vehicle;

FIG. 2A is a schematic diagram of the four wheels of the vehicle of FIG. 1, showing the manner in which the left-hand wheels may be turned about their horizontal axis to effectuate a left turn of the vehicle;

FIG. 2B is a schematic diagram, similar to the diagram of FIG. 1, and showing how the four wheels of the vehicle may be turned to a position in which the vehicle is stopped;

FIG. 2C is a schematic diagram, like FIGS. 2A and 2B, and showing the manner in which the four wheels of the vehicle may be turned about their respective horizontal axes to slow down the vehicle from its maximum speed;

FIGS. 3A and 3B are schematic representations of the wheels of the vehicle of FIG. 1 having a slightly different configuration which, together with other equivalent shapes, are also intended to come within the definition of "spherical configuration" used throughout the present specification and claims;

FIG. 4 is a schematic representation of an appropriate drive mechanism for controlling the inclinations of the wheels of the vehicle of FIG. 1;

FIG. 5 is a front schematic view of a vehicle equipped with fully spherical wheels representing a second embodiment of the invention;

FIG. 6 is a top plan view of the embodiment of FIG. 5; and

FIG. 7 is a perspective schematic view of an appropriate drive train for the embodiment of FIGS. 4 and 5.

DETAILED DESCRIPTION OF THE ILLUSTRATED EMBODIMENT

The vehicle shown in FIG. 1 is designated 10, and it contains front wheels, such as wheel 12 and rear wheels, such as wheel 14 which are rotatably mounted on the frame of the vehicle As shown, for example, in FIG. 2A, the wheels 12 and 14 all have a spherical configuration, and they are capable of being tilted about respective horizontal shafts 16 and 18. The wheels are rotatably mounted on respective axles 20 and 22, which are attached to shafts 16 and 18, and which extend perpendicularly to the respective shafts 16 and 18.

In FIG. 2A, the left front wheel is designated 12A, and the right front wheel is designated 12B, hereas the left rear wheel is designated 14A and the right rear wheel is designated 14B. Likewise, the left turning shaft for the left front wheel is designated 16A, and the right turning shaft for the right front wheel is designated 16B. In like manner, the left turning shaft for the left rear wheel is designated 18A, and the right turning shaft for the right rear wheel is designated 18B. The axle for the left front wheel is designated 20A, and the axle for the right front wheel is designated 20B. In like manner, the axle for the left rear wheel is designated 22A, and the axle for the right rear wheel is designated 22B.

In the representation of FIG. 2A, the left wheels 12A and 14A are tilted about their respective turning shafts 16A and 22A, as shown, so that the left wheels are rotating about a smaller diameter and cover less distance than the right wheels when the wheels are turned at the same speed. This causes the vehicle to turn to the left, as indicated by the arrow in FIG. 2A.

It will be appreciated that should the right wheels 12B and 14B be turned on their respective turning shafts 16B and 18B, rather than the left wheels, the vehicle will turn to the right. It should also be appreciated that although a four-wheel drive is described above, appropriate controls may be achieved by controlling, for example, only the two front or rear wheels.

In FIG. 2B, all four wheels 12A, 12B, 14A and 14B are turned about their turning shafts through 90° relative to the position shown in FIG. 1. In the position shown in FIG. 2B, the wheels are turned about their centers by the drive motor, and there is no movement of the vehicle. Accordingly, to stop the vehicle, it is merely necessary to turn the wheels to the position shown in FIG. 2B.

All intermediate positions between the maximum speed position shown by the positions of the right wheels of FIG. 2A, and the stop position shown by the position of the wheels in FIG. 2B, may be controlled by turning the left and right wheels in opposite directions about their turning shafts to selected inclinations, such as shown in FIG. 2C. When the wheels have the position of FIG. 2C, the vehicle travels at a slower speed than when they are in the position shown by the right wheels in FIG. 2A. Also, as the vehicle travels at slower speeds, a higher torque is exerted by the drive motor on the wheels.

As shown in FIGS. 3A and 3B, the wheels of the vehicle, designated 28 may have a slightly different shape. As stated above, the definition of "spherical", as used in the present specification and claims, is intended to cover the shapes shown in FIG. 3A, and equivalent shapes.

In the schematic diagram of FIG. 4, the axles 20A and 22A of wheels 12A and 14A are rotatably mounted to respective cross members 40A and 40B of the frame of vehicle 10 of FIG. 1 for rotation about a first horizontal axis extending parallel to the longitudinal axis of the vehicle, this being achieved by means of a turning shaft 42, which is also a drive shaft for wheels 12A and 14A. Likewise, the axles 20B and 22B of wheels 12B and 14B are rotatably mounted to the respective cross members 40A and 40B for angular movement about a second horizontal axis extending parallel to the longitudinal axis of the vehicle, this being achieved by means of a turning shaft 44.

The mechanism of FIG. 4 includes a constant speed drive motor 50 which is coupled to a pair of worm gears 52 and 54 through a pinion 56 and drive gear 58. The worm gears 52 and 54 are coupled to respective drive shafts 42 and 44 through gears 60 and 61. The drive shaft 42 drives wheels 12A and 14A through respective pinions 62 and 64 which engage gear teeth extending around the peripheral edges of the respective gears.

Likewise, drive shaft 44 is coupled to wheels 12B and 14B through respective pinions 66 and 68 which engage teeth extending around the peripheral edges of the respective wheels, but which could be on the inside of the wheels.

When the motor 50 is energized, it drives the four wheels through the illustrated drive mechanism as the wheels are turned about their respective horizontal turning axes. An appropriate control unit 70 is used to turn the wheels about their turning axes to the selected positions described above, for steering the vehicle, and for controlling its speed and torque.

It will be appreciated that the mechanism of FIG. 4 is shown merely by way of example, and that other appropriate mechanisms may be used to drive the wheels of the vehicle. It will also be appreciated that many known types of control mechanisms may be used for selectively controlling the angular positions of the various wheels about their turning axis.

The vehicle shown in FIGS. 5 and 6 includes a body 100, and it is equipped with front wheels 112A and 112B and rear wheels 114A and 114B. Wheels 112A and 112B are rotatably mounted on a pivoted arm 113 by way of axles represented by the broken lines 115 and 116. Arm 113 is pivoted to the body 100 of the vehicle. Likewise, wheels 112B and 114B are rotatably mounted on an arm 117 which is pivoted to the opposite side of the body 100, the wheels 112B and 114B being rotatably mounted on respective axles represented by the broken lines 119 and 121.

The wheels are driven by a motor 150 through a drive train shown schematically, for example, in FIG. 7. The right or left half gear train shown in FIG. 7 drives wheels 112A and 114A. A similar drive train may be used to drive the wheels 112B and 114B.

In the drive train of FIG. 7, the drive shaft 151 of motor 150 is keyed to a pinion gear 152 which engages a crown gear 154. The crown gear is rotatably mounted in line with the pivotal axis of the wheels 112A and 114A. A further pinion gear 156 is coupled to the crown gear and it drives a pinion gear 160 through a drive shaft 158. Gear 160 is coupled to a crown gear 162 which is keyed to a shaft 163. Crown gears 164 and 166 are mounted at the respective ends of shaft 163 and are coupled through gears 174 and 168 to the respective axles 115 and 116 of the wheels 112A and 114A.

As shown in FIGS. 5 and 6, the wheels may be tilted to control their running surfaces, so as to achieve the maneuvers described above. For all tilts of the wheels, motor 150 drives them through the gear train described in conjunction with FIG. 7.

The fully spherical wheels of the embodiment of FIGS. 5–7 have an advantage, in that the vehicle may be easily adapted to be driven on land and water.

It will be appreciated that although particular embodiments of the invention have been shown and described, modifications may be made. It is intended in the claims to cover all modifications which come within the true spirit and scope of the invention.

I claim:

1. A vehicle comprising: a frame; first and second drive shafts rotatably mounted on said frame on opposite sides thereof and extending along said frame parallel to one another; two front wheels and two rear wheels each having a spherical configuration; four axles coupling respective ones of said wheels to said drive shafts and angularly movable about the respective axes of rotation of said drive shafts; means coupling said drive shafts to respective ones of said wheels to impart rotational movement to said wheels about the axes of respective ones of said axles; a drive motor coupled to said drive shafts to impart rotational motion to said drive shafts about the respective longitudinal axes thereof; and a steering and speed control unit coupled to said axles to move said axles on one side of said frame about the axis of rotation of one of said drive shafts in unison to selected angular positions, and independently to move the axles of the other side of said frame about the longitudinal axis of the other side drive shafts in unison to selected angular positions.

2. The vehicle defined in claim 1, in which said wheels each has the form of a hemisphere.

* * * * *